United States Patent
Higashi (10) Patent No.: US 11,145,204 B2
(45) Date of Patent: Oct. 12, 2021

(54) SNOW REMOVAL APPARATUS OPERATING SYSTEM AND SNOW REMOVAL APPARATUS OPERATING METHOD

(71) Applicant: Honda Motor Co., Ltd., Tokyo (JP)

(72) Inventor: Haruomi Higashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/808,391

(22) Filed: Mar. 4, 2020

(65) Prior Publication Data

US 2020/0286381 A1 Sep. 10, 2020

(30) Foreign Application Priority Data

Mar. 7, 2019 (JP) .............................. JP2019-041475

(51) Int. Cl.
*G08G 1/00* (2006.01)
*G08G 1/14* (2006.01)
(Continued)

(52) U.S. Cl.
CPC ......... *G08G 1/147* (2013.01); *B60W 60/0025* (2020.02); *E01H 5/04* (2013.01); *G08G 1/202* (2013.01); *H04W 4/44* (2018.02)

(58) Field of Classification Search
CPC ........ G08G 1/147; G08G 1/202; G08G 1/148; G08G 1/146; G08G 1/142; G08G 1/144;
(Continued)

(56) References Cited

U.S. PATENT DOCUMENTS 7,116,246 B2 * 10/2006 Winter ..................... G08G 1/14
340/932.2
7,123,166 B1 * 10/2006 Haynes ..................... G08G 1/14
340/932.2
(Continued)

FOREIGN PATENT DOCUMENTS

CN 102426801 4/2012
CN 104112370 10/2014
(Continued)

OTHER PUBLICATIONS

Office Action of China Counterpart Application, with English translation thereof, dated Jun. 10, 2021, pp. 1-19.

*Primary Examiner* — Peter D Nolan
*Assistant Examiner* — Peter Y Ning
(74) *Attorney, Agent, or Firm* — JCIPRNET (57) ABSTRACT

A snow removal apparatus operating system and a snow removal apparatus operating method capable of efficiently performing snow removal in a parking lot while reducing costs are provided. A specific parking section determination part determines a specific parking section for securing a vacant parking space according to a parking request from among parking sections recognized to have vacant parking spaces having snow accumulation if there is no parking section recognized to have a vacant parking space having no snow accumulation when a parking request recognition part recognizes the parking request. A snow removal instruction part transmits, to a snow removal apparatus, first snow removal instruction information for instructing snow removal in the specific parking section.

6 Claims, 4 Drawing Sheets

(51) Int. Cl.
*H04W 4/44* (2018.01)
*B60W 60/00* (2020.01)
*E01H 5/04* (2006.01)

(58) Field of Classification Search
CPC .... G08G 1/149; H04W 4/44; B60W 60/0025; E01H 5/04; E01H 5/00; G05D 1/0282; G05D 2201/0203; G06Q 10/0631; G06K 9/00791
See application file for complete search history.

(56) References Cited

U.S. PATENT DOCUMENTS

| | | | |
|---|---|---|---|
| 9,165,352 B2* | 10/2015 | Wu | G06T 5/50 |
| 10,113,280 B2* | 10/2018 | Letsky | E01H 5/00 |
| 2011/0102197 A1* | 5/2011 | Herwich | E01F 9/559 |
| | | | 340/932.2 |
| 2015/0310745 A1* | 10/2015 | Osment | G06K 9/00771 |
| | | | 348/143 |
| 2016/0371978 A1* | 12/2016 | Nordbruch | G08G 1/14 |
| 2017/0148324 A1* | 5/2017 | High | G06K 9/00771 |
| 2018/0143634 A1* | 5/2018 | Ott | G05D 1/0214 |
| 2018/0180440 A1* | 6/2018 | Masuda | G01C 21/3461 |
| 2018/0203463 A1* | 7/2018 | Smith | B62D 1/283 |
| 2019/0002256 A1* | 1/2019 | High | B07C 5/3422 |

FOREIGN PATENT DOCUMENTS

| | | | |
|---|---|---|---|
| CN | 106781685 | | 5/2017 |
| CN | 108745697 | | 11/2018 |
| JP | 2003013418 | | 1/2003 |
| JP | 2012177673 A | * | 9/2012 |
| JP | 2018149983 A | * | 9/2018 |

* cited by examiner

| 33a | 33b | 33c | 33d | 33e | 33f | 33g | 33h |
|---|---|---|---|---|---|---|---|
| No. | user information | usage state | entry time | exit time | predicted exit time | snow accumulation | specific parking section |
| L1-1 | UI-11 | in use | 11:00 | — | 12:50 | — | — |
| L1-2 | UI-12 | in use | 11:10 | — | — | — | — |
| L1-3 | UI-13 | in use | 12:05 | — | — | — | — |
| ″ | ″ | ″ | ″ | ″ | ″ | ″ | ″ |
| L2-1 | UI-21 | in use | 12:20 | — | — | — | — |
| L2-2 | UI-22 | in use | 11:40 | — | 13:20 | — | — |
| L2-3 | UI-23 | in use | 11:30 | — | 13:10 | — | — |
| ″ | ″ | ″ | ″ | ″ | ″ | ″ | ″ |
| L3-1 | UI-31 | in use | 12:40 | — | — | — | — |
| L3-2 | UI-32 | in use | 12:15 | — | 13:15 | — | — |
| L3-3 | UI-33 | vacant | — | 11:50 | — | — | ○ |
| ″ | ″ | ″ | ″ | ″ | ″ | ″ | ″ |
| L4-1 | UI-41 | vacant | — | 11:30 | — | presence | — |
| L4-2 | UI-42 | vacant | — | 10:20 | — | presence | — |
| L4-3 | UI-43 | vacant | — | 10:30 | — | presence | — |
| ″ | ″ | ″ | ″ | ″ | ″ | ″ | ″ |

SNOW REMOVAL APPARATUS OPERATING SYSTEM AND SNOW REMOVAL APPARATUS OPERATING METHOD

CROSS-REFERENCE TO RELATED APPLICATION

This application claims the priority benefits of Japan Patent Application No. 2019-041475, filed on Mar. 7, 2019. The entirety of the above-mentioned patent application is hereby incorporated by reference herein and made a part of this specification.

BACKGROUND

Technical Field

The disclosure relates to a snow removal apparatus operating system and a snow removal apparatus operating method.

Description of Related Art

Conventionally, a snow removal robot vehicle moving system which detects a snow accumulation state of a motorway using a snow accumulation detection sensor installed on a road side and dispatches a snow removal robot vehicle standing by in a parking lot according to the snow accumulation state has been proposed (refer to Patent Document 1 (Japanese Patent Laid-Open No. 2003-13418), for example).

In the aforementioned system described in Patent Document 1, snow removal in a wide range is performed using a large-scale snow removal robot in order to secure traveling of vehicles on motorways of public infrastructures. In parking lots or the like of stores, although it is also necessary to perform snow removal in order to secure access of vehicles entering stores to parking lots when snow is accumulated, introduction of a large-scale snow removal robot as in snow removal of motorways is inefficient and financially disadvantageous.

The disclosure devised in view of such circumstances provides a snow removal apparatus operating system and a snow removal apparatus operating method which can efficiently perform snow removal in parking lots while reducing cost.

SUMMARY

According to an embodiment, a snow removal apparatus operating system including: a snow state recognition part which recognizes a snow accumulation state of a parking lot in which a plurality of parking sections is provided; a parking section management part which manages entry and exit of a vehicle for each of the parking sections; a parking request recognition part which recognizes a request for parking in the parking lot; a specific parking section determination part which determines a specific parking section for securing a vacant parking space according to the request for parking from among the parking sections recognized to have snow accumulation by the snow state recognition part and recognized to have a vacant parking space by the parking section management part if there is no parking section recognized to have no snow accumulation by the snow state recognition part and recognized to have a vacant parking space by the parking section management part when the request for parking is recognized by the parking request recognition part; and a snow removal instruction part which transmits, to a snow removal apparatus disposed in order to perform snow removal in the parking lot, a first snow removal instruction information for instructing snow removal in the specific parking section may be conceived.

Here, no snow accumulation in a parking section includes a case in which there is slight snow accumulation in the parking section and there is no obstacle to entry and exit of vehicles in addition to a case in which there is no snow accumulation at all. In addition, transmission of the first snow removal instruction information to the snow removal apparatus includes transmission of the first snow removal instruction information to a communication terminal included in the snow removal apparatus and transmission of the first snow removal instruction information to a driver terminal carried by a driver who drives the snow removal apparatus.

According to another embodiment, a snow removal apparatus operating method executed by a computer in order to operate a snow removal apparatus may be conceived, the snow removal apparatus operating method including: a snow state recognition step of recognizing, by the computer, a snow accumulation state of a parking lot in which a plurality of parking sections is provided; a parking section management step of managing, by the computer, entry and exit of a vehicle for each of the parking sections; a parking request recognition step of recognizing, by the computer, a request for parking in the parking lot; a specific parking section determination step of determining, by the computer, a specific parking section for securing a vacant parking space according to the request for parking from among the parking sections recognized to have snow accumulation in the snow state recognition step and recognized to have a vacant parking space in the parking section management step if there is no parking section recognized to have no snow accumulation in the snow state recognition step and recognized to have a vacant parking space in the parking section management step when the request for parking is recognized in the parking request recognition step; and a snow removal instruction step of transmitting, to a snow removal apparatus disposed in order to perform snow removal in the parking lot, a first snow removal instruction information for instructing snow removal in the specific parking section.

DESCRIPTION OF THE EMBODIMENTS

In the snow removal apparatus operating system, an entry vehicle detection part which detects a vehicle entering the parking lot may be included, and the parking request recognition part may recognize a request for parking in the parking lot on the basis of a detection result obtained by the entry vehicle detection part.

In the snow removal apparatus operating system, the snow state recognition part may recognize a snowfall state of the parking lot, and the specific parking section determination part may determine the parking section in which an elapsed time from a previous vehicle exit time recognized by the parking section management part is within a predetermined time at the specific parking section when the snow state recognition part recognizes snowfall in the parking lot.

In the snow removal apparatus operating system, the snow state recognition part may recognize a snowfall state of the parking lot, and the specific parking section determination part may preferentially determine the parking section in which an elapsed time from a previous vehicle exit time recognized by the parking section management part is short at the specific parking section when the snow state recognition part recognizes snowfall in the parking lot.

In the snow removal apparatus operating system, the parking section management part may recognize a predicted exit time of a vehicle parked in the parking section, and when the snow state recognition part recognizes snow accumulation with respect to a predicted exit parking section which is the parking section for which the predicted exit time is recognized, the snow removal instruction part may transmit, to the snow removal apparatus, a second snow removal instruction information for instructing snow removal in the predicted exit parking section from a snow removal time corresponding to vehicle exit based on the predicted exit time.

According to the snow removal apparatus operating system, when the parking request recognition part recognizes a request for parking in a parking lot, if there is no parking section having a vacant parking space and no snow accumulation, a specific parking section for securing a vacant parking space is determined by the specific parking section determination part. Then, the snow removal instruction part transmits the first snow removal instruction information for instructing snow removal in the specific parking section to the snow removal apparatus. Accordingly, it is possible to perform snow removal in the parking lot only for the specific parking section determined according to the parking request. Therefore, it is possible to efficiently remove snow in the parking lot at a low cost as compared to a case in which snow removal is performed by a large-scale snow removal apparatus for the entire parking lot. The same operations and effects can also be obtained in the case of the above-described snow removal apparatus operating method.

1. Snow Removal State of Parking Lot According to Snow Removal Apparatus Operating System A snow removal state of a parking lot 120 according to a snow removal apparatus operating system 1 (hereinafter simply called an operating system 1) of the embodiment will be described with reference to FIG. 1. The parking lot 120 is in a site 100 of a store 110 and the operating system 1 manages operation of a snow removal apparatus 60 disposed in the parking lot 120.

Figure 1:
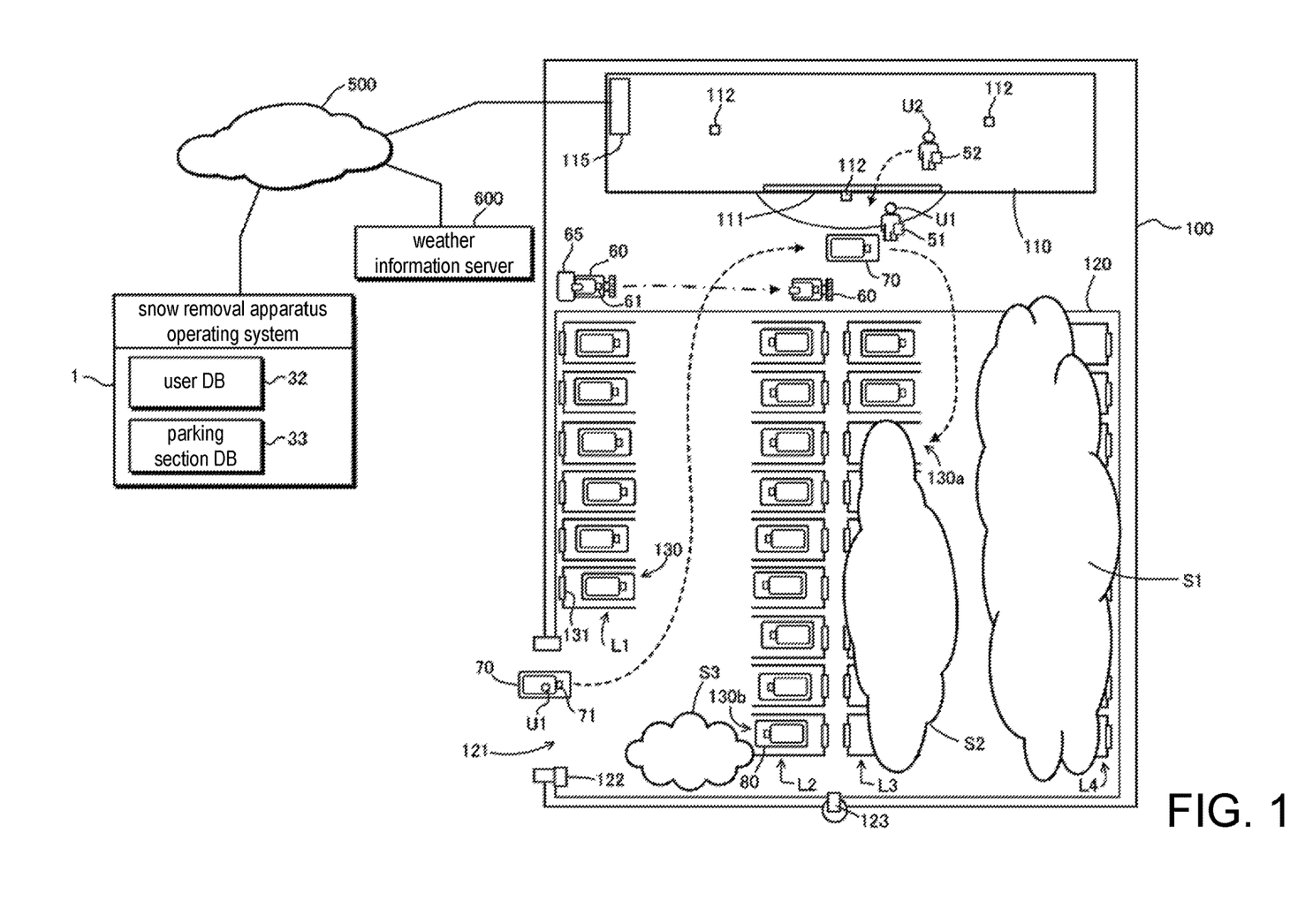
FIG. 1 is an explanatory diagram for a snow removal state of a parking lot according to a snow removal apparatus operating system.

A plurality of parking sections 130 divided into four lines L1 to L4 is provided in the parking lot 120. An entry sensor 131 which detects a vehicle parked in each parking section 130 is provided in each parking section 130. The entry sensor 131 detects a vehicle parked in the parking section 130 using a captured image of a camera, an ultrasonic sensor, a photoelectric sensor, a laser sensor, or the like.

A plurality of store cameras 112 which photographs the inside of the store 110 and the region around an entrance 111 is installed in the store 110. An entrance camera 122 which photographs vehicles entering the parking lot 120 and vehicles exiting the parking lot 120 is installed at an entrance 121 of the parking lot 120. In addition, a parking lot camera 123 having the entire parking lot 120 as a photographing range is installed in the parking lot 120. FIG. 1 shows a situation in which there is snow accumulation S1, S2 and S3 in the parking lot 120.

The snow removal apparatus 60 is an autonomous moving type robot vehicle and an electric vehicle including a battery which is not shown. The snow removal apparatus 60 stands by in a place where a battery charger 65 is installed, appropriately charges the battery and autonomously travels in the parking lot 120 to perform snow removal in response to a snow removal instruction from the operating system 1.

The operating system 1 performs communication among the entry sensor 131, the store camera 112, the entrance camera 122 and the parking lot camera 123 through a communication network 500 to acquire vehicle detection information obtained by the entry sensor 131 and captured images of the respective cameras 112, 122 and 123. Further, the vehicle detection information obtained by the entry sensor 131 and the captured images of the respective cameras 112, 122 and 123 may be stored in a management system 115 included in the store 110 and the vehicle detection information and captured images stored in the management system 115 may be transmitted to the operating system 1 through the communication network 500.

The operating system 1 performs communication among a snow removal apparatus controller 61 included in the snow removal apparatus 60, a vehicle controller included in each vehicle using the parking lot, and a user terminal used by a user of a vehicle through the communication network 500. FIG. 1 illustrates a vehicle controller 71 of a first vehicle 70, a first user terminal 51 used by a first user U1 who has driven the first vehicle 70 and entered the store 110, and a second user terminal 52 used by a second user U2 who has driven a second vehicle 80 and entered the store 110. In addition, the operating system 1 acquires weather information (snowfall information and the like) of an area where the parking lot 120 is located by performing communication with a weather information server 600 which provides weather information through the communication network 500.

The operating system 1 includes a user database (DB) 32 in which information on users who use the store 110 is recorded and a parking section DB 33 in which states (usage states, snow accumulation states, and the like) of the respective parking sections 130 are recorded. When the operating system 1 detects a vehicle entering the parking lot 120 from a captured image of the entrance camera 122, the operating system 1 instructs the snow removal apparatus 60 to remove snow in a vacant parking section having snow accumulation in order to secure a parking space for the vehicle entering the parking lot 120 as necessary.

FIG. 1 shows a state in which the operating system 1 instructs the snow removal apparatus 60 to remove snow in a parking section 130*a* having snow accumulation in order to secure a parking space for the first vehicle 70 when the operating system 1 detects the first vehicle 70 which has entered the parking lot 120. The first user U1 who has driven the first vehicle 70 and visited the store 110 alights from the first vehicle 70 at the entrance 111 of the store 110 and the first vehicle 70 travels to the parking section 130*a* according to autonomous driving and parks there. The snow removal apparatus 60 removes snow in the parking section 130*a* before the first vehicle 70 arrives at the parking section 130*a*.

In addition, FIG. 1 shows a state in which the operating system 1 instructs the snow removal apparatus 60 to remove snow near a parking section 130*b* in which the second vehicle 80 that the second user U2 drove to the store 110 is parked when the operating system 1 detects the second user U2 who has finished business in the store 110 and moves towards the parking lot 120 from a captured image of the store camera 112. The snow removal apparatus 60 removes snow accumulation S3 in front of the parking section 130b such that the second vehicle 80 can exit the parking section 130b.

In this manner, the operating system 1 performs snow removal using the snow removal apparatus 60 only in the parking section 130a and the region around the parking section 130b where snow removal is required. Accordingly, it is possible to efficiently perform snow removal using the relatively small snow removal apparatus 60 to secure a parking space for a user who enters the store 110 as compared to a case in which snow removal is performed for the entire parking lot 120 all the time.

2. Configuration of Snow Removal Apparatus Operating System

Figure 2:
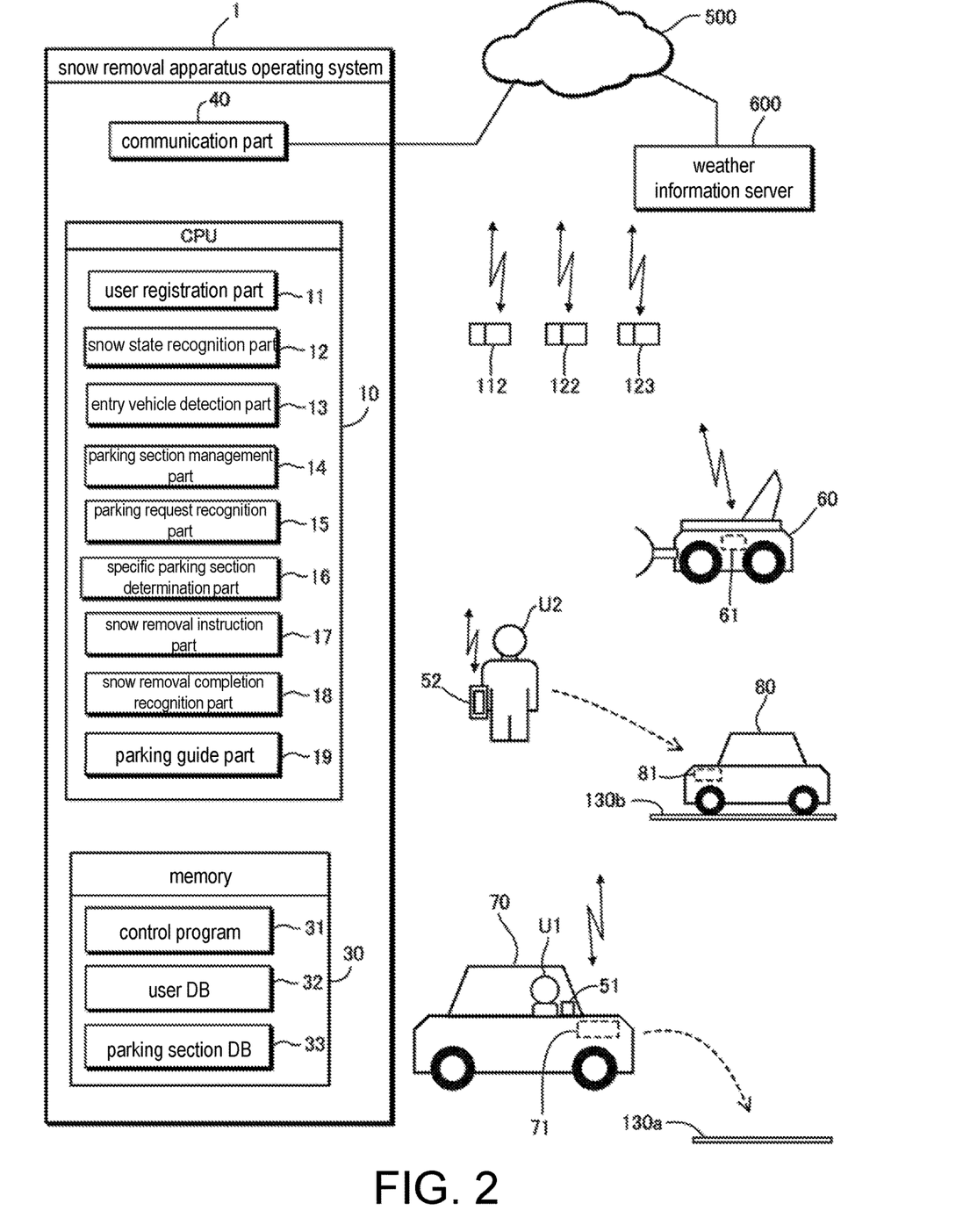
FIG. 2 is a configuration diagram of a snow removal apparatus operating system.
Figure 3:
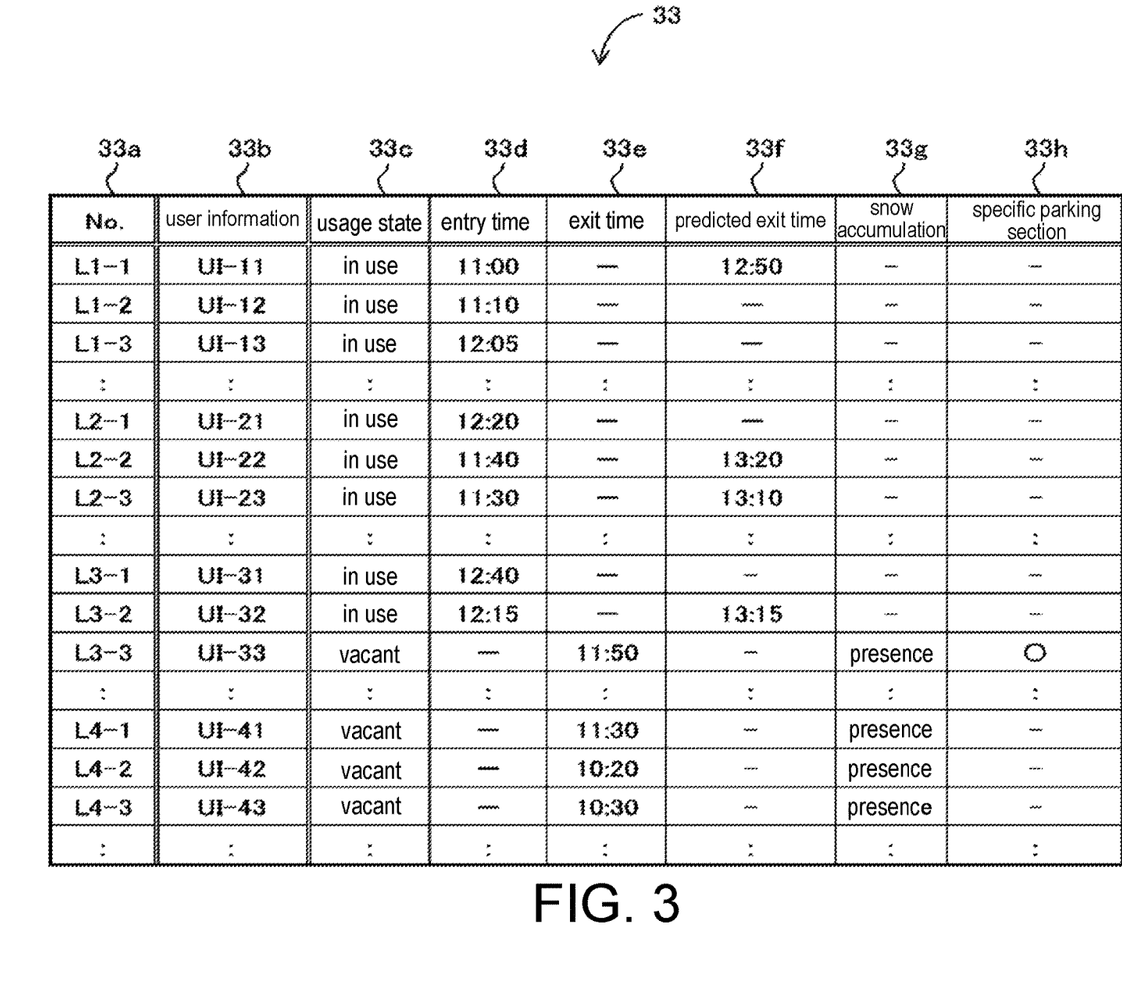
FIG. 3 is an explanatory diagram of a parking section database.

The configuration of the operating system 1 will be described with reference to FIG. 2 and FIG. 3. FIG. 2 shows the first vehicle 70, the first user U1, the second vehicle 80, and the second user U2 shown in FIG. 1. The first vehicle 70 includes a first vehicle controller 71 which controls the operation of the first vehicle 70 and the second vehicle 80 includes a second vehicle controller 81 which controls the operation of the second vehicle 80.

The first user U1 carries a first user terminal 51 and the second user U2 carries a second user terminal 52. Description will be given with reference to a situation shown in FIG. 1 in which the first user U1 rides in the first vehicle 70 and enters the parking lot 120 and the second user U2 rides in the second vehicle 80 and exits the parking lot.

As shown in FIG. 2, the operating system 1 is a computer system including a central processing unit (CPU) 10, a memory 30, a communication part 40, and the like. The operating system 1 performs communication among the snow removal apparatus controller 61, the first vehicle controller 71, the second vehicle controller 81, the first user terminal 51, the second user terminal 52, the store camera 112, the entrance camera 122, the parking lot camera 123, and the weather information server 600 using the communication part 40 through the communication network 500.

The memory 30 stores a control program 31 of the operating system 1 in addition to the aforementioned user DB 32 and parking section DB 33. The CPU 10 serves as a user registration part 11, a snow state recognition part 12, an entry vehicle detection part 13, a parking section management part 14, a parking request recognition part 15, a specific parking section determination part 16, a snow removal instruction part 17, a snow removal completion recognition part 18, and a parking guide part 19 by reading and executing the control program 31 stored in the memory 30.

Here, processing executed by the snow state recognition part 12 corresponds to a snow removal state recognition step in a snow removal apparatus operating method of the disclosure and processing executed by the parking section management part 14 corresponds to a parking section management step in the snow removal apparatus operating method of the disclosure. In addition, processing executed by the parking request recognition part 15 corresponds to a parking request recognition step in the snow removal apparatus operating method of the disclosure and processing executed by the specific parking section determination part 16 corresponds to a specific parking section determination step in the snow removal apparatus operating method of the disclosure. Further, processing executed by the snow removal instruction part 17 corresponds to a snow removal instruction step in the snow removal apparatus operating method of the disclosure.

The user registration part 11 records identification information of each user of the store 110 in the user DB 32. User identifications (IDs) issued for users, face images of users, communication addresses of user terminals used by users, information on vehicles (vehicle types, registration numbers, communication addresses of mounted vehicle controllers, etc.) used by users, and the like are recorded as identification information. The snow state recognition part 12 recognizes a snow accumulation state of each parking section 130 of the parking lot 120 and a snow accumulation state of the parking lot 120 from weather information of the area where the parking lot 120 is located which is provided from the weather information server 600 and snow accumulation and snowfall states of the parking lot 120 recognized from captured images of the parking lot camera 123.

The snow state recognition part 12 determines "no snow accumulation" with respect to a vacant parking section 130 recognized as a parking section which has no snow accumulation or a snow accumulation percentage is a predetermined % or less and that is not an obstacle to entry of a vehicle and determines "snow accumulation" with respect to a vacant parking section 130 recognized as a parking section in which a snow accumulation percentage exceeds the predetermined % from a captured image of the parking lot camera 123. Further, when a snow accumulation height can be recognized from a captured image of the parking lot camera 123, the snow state recognition part 12 may determine "no snow accumulation" when the snow accumulation height is equal to or less than a predetermined height.

In addition, a snow accumulation level determined as "no snow accumulation" may be changed according to vehicle types recorded in the user DB 32. For example, the snow accumulation level determined as "no snow accumulation" may be set to be high (a threshold value of a percentage of a snow accumulation part determined as "no snow accumulation" is set to be high or a threshold value of a snow accumulation height determined as "no snow accumulation" is set to be high) with respect to a vehicle type having a road handling ability for snowy roads, such as a sport utility vehicle (SUV).

The entry vehicle detection part 13 detects vehicles entering the parking lot 120 from captured images of the entrance camera 122. In the example of FIG. 1, the first vehicle 70 is detected. The parking section management part 14 recognizes a usage state of each parking section 130 and records the usage state in the parking section DB 33. As shown in FIG. 3, No. 33a of each parking section 130, user information 33b, a usage state 33c, an entry time 33d, an exit time 33e, a predicted exit time 33f, snow accumulation 33g, and a specific parking section 33h are recorded in the parking section DB 33 for each parking section 130.

No. 33a is a number indicating a place of a parking section 130 using lines L1 to L4 and a position from the store 110. For example, L3-3 may indicate the third parking section 130 from the store 110 in line L3. Identification information of users using the parking sections 130 is recorded in the user information 33b. User IDs recorded in the user DB 32, communication addresses of user terminals, face images of users extracted from captured images of the entrance camera 122, and the like are recorded as user identification information.

Whether each parking section 130 is being used on the basis of detection information detected by the entry sensor 131 installed in each parking section 130 is recorded in the usage state 33c. A time at which entry of a vehicle to each parking section 130 is detected by the entry sensor 131 is recorded in the entry time 33d. A time at which exit of a vehicle from each parking section 130 is detected by the entry sensor 131 is recorded in the exit time 33e.

A time at which a parked vehicle is predicted to exit is recorded in the predicted exit time 33f. In the example of FIG. 1, the parking section management part 14 extracts an image portion of the second user U2 from a captured image of the store camera 112 and recognizes a movement situation of the second user U2. Extraction of the image portion of the second user U2 is performed through pattern matching processing using a face image of the second user U2 recorded in the user information 33b as a template, or the like. In addition, when a situation in which the second user U2 moves out of the store 110 is recognized, for example, the parking section management part 14 may set a predicted exit time after a first predetermined time from the recognition time and records the predicted exit time in the parking section DB 33. Further, when information indicating the completion of business in the store 110 or a business completion time is received from the second user terminal 52, the parking section management part 14 also sets a predicted exit time and records the predicted exit time in the parking section DB 33.

Presence or absence of snow accumulation in vacant parking sections 130 recognized by the snow state recognition part 12 is recorded in the snow accumulation 33g. A determination instruction for a specific parking section which will be described later is recorded in the specific parking section 33h. In the specific parking section 33h of FIG. 3, a parking section determined as a specific parking section is indicated by marking "0."

The parking request recognition part 15 recognizes a request for parking in the parking lot 120 on the basis of a detection result of the entry vehicle detection part 13. The parking request recognition part 15 recognizes a request for parking in the parking lot when a vehicle entering the parking lot 120 is detected by the entry vehicle detection part 13. In addition, at a date and time when the number of persons visiting the store 110 is predicted to increase on the basis of past records of the number of persons visiting the store 110, a request for parking in the parking lot may be recognized. In this case, parking requests for securing a plurality of vacant parking sections 130 may be recognized.

The specific parking section determination part 16 determines whether there is a vacant parking section 130 having no snow accumulation with reference to the parking section DB 33 when the parking request recognition part 15 recognizes a request for parking in the parking lot 120. Then, the specific parking section determination part 16 determines a specific parking section which is a snow removal target from among parking sections 130 having snow accumulation according to determination conditions 1 and 2 below when there is no vacant parking section 130 having no snow accumulation. In the example of FIG. 1, the parking section 130a is determined as a specific parking section. Then, the specific parking section determination part 16 records a determination instruction in the corresponding specific parking section 33h of the parking section DB 33 with respect to the parking section 130 determined as a specific parking section.

Determination condition 1: when the snow state recognition part 12 recognizes snowfall in the parking lot 120, a parking section 130 in which an elapsed time from an exit time is within a second predetermined time (corresponding to a predetermined time of the disclosure) from among vacant parking sections 130 having snow accumulation is determined as a specific parking section.

Determination condition 2: when the snow state recognition part 12 recognizes snowfall in the parking lot 120, a parking section 130 in which an elapsed time from an exit time is short from among vacant parking sections 130 having snow accumulation is preferentially selected and determined as a specific parking section.

When a parking section 130 (the parking section 130 of No. L3-3 in the example of FIG. 3) for which a determination instruction has been recorded in the specific parking section 33h is recognized with reference to the parking section DB 33, the snow removal instruction part 17 transmits first snow removal instruction information for instructing snow removal in the specific parking section to the snow removal apparatus controller 61. The snow removal apparatus controller 61 which has received the first snow removal instruction information causes the snow removal apparatus 60 to autonomously travel to execute snow removal in the specific parking section.

In addition, when there is a predicted exit parking section which is a parking section 130 in which a predicted exit time has been recorded in the predicted exit time 33f with reference to the parking section DB 33, the snow removal instruction part 17 transmits, to the snow removal apparatus controller 61, a second snow removal instruction information for instructing snow removal in the predicted exit parking section to be started from a snow removal time corresponding to vehicle exit which is set before the predicted exit time. In the example of FIG. 1, a parking section 130b is a parking section from which a vehicle is predicted to exit. The snow removal apparatus controller 61 which has received the second snow removal instruction information causes the snow removal apparatus 60 to autonomously travel to remove snow in the region around the parking section 130b predicted to be vacant and on a route from the parking section 130b predicted to be vacant to the entrance 121 of the parking lot 120.

The snow removal completion recognition part 18 recognizes that snow removal is completed by receiving snow removal completion information notifying of completion of snow removal from the snow removal apparatus controller 61 of the snow removal apparatus 60 which has performed snow removal according to reception of the first snow removal instruction information or the second snow removal instruction information. The parking section management part 14 deletes the record of a determination instruction for a specific parking section in which snow removal is completed from the parking section DB 33 when it recognizes that snow removal according to the first snow removal instruction information is completed. In addition, the parking section management part 14 deletes the record of a predicted exit time of a predicted exit parking section, for which snow removal is completed in the region around it, from the parking section DB 33 when it recognizes that snow removal is completed according to the second snow removal instruction information.

The parking guide part 19 transmits parking guide information for guiding the place of the specific parking section 130a in which snow has been removed to the first vehicle controller 71 of the first vehicle 70 and the first user terminal 51 when the snow removal completion recognition part 18 recognizes that snow removal in the specific parking section 130a is completed.

In addition, the parking guide part 19 transmits second parking guide information for notifying the second user terminal 52 that snow removal in the parking section in which the second vehicle 80 is parked is completed to the second user terminal 52 when the snow removal completion recognition part 18 recognizes completion of snow removal in the region around the parking section 130b predicted to be vacant in which the second vehicle 80 is parked to the entrance 121.

3. Snow Removal Apparatus Operating Processing

Figure 4:
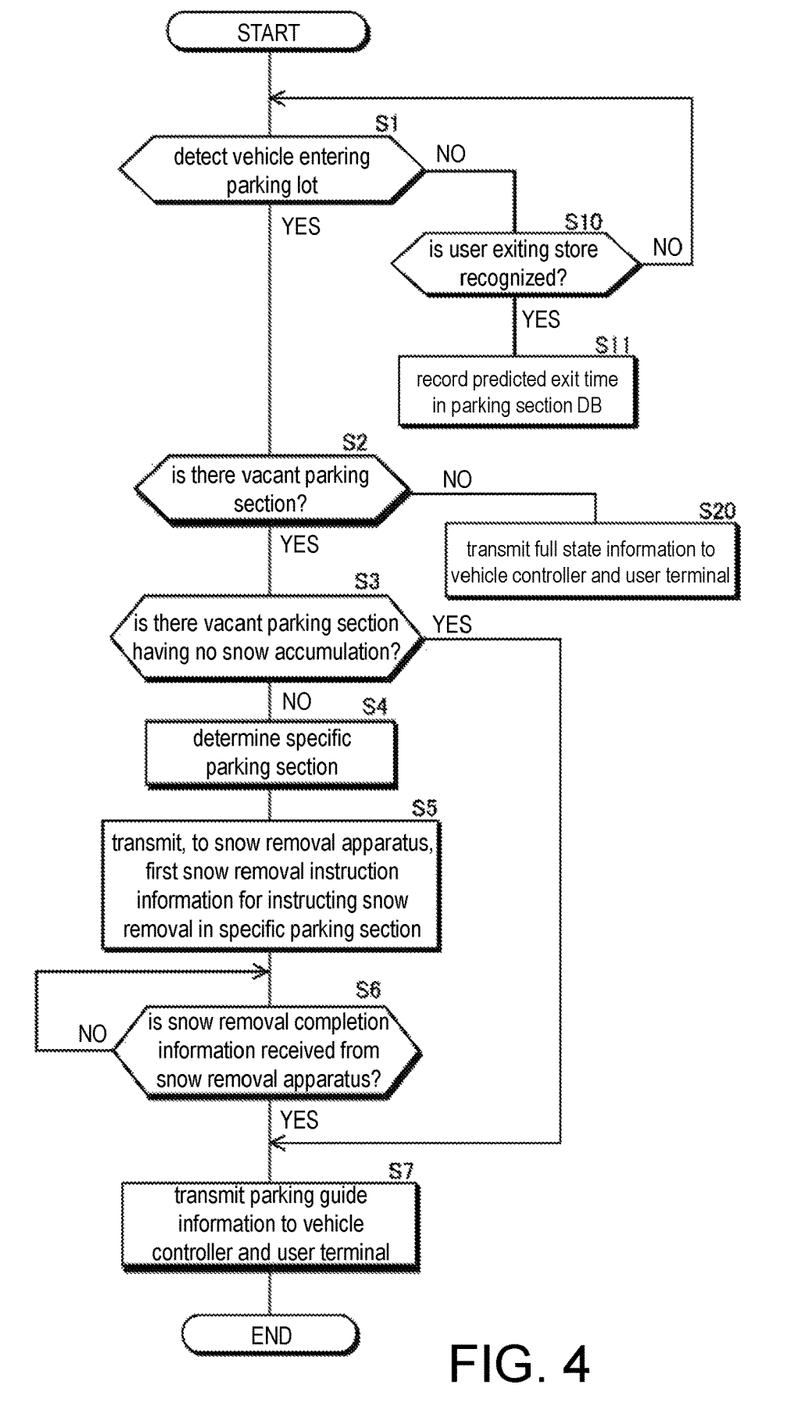
FIG. 4 is a flowchart of snow removal apparatus operating processing.

A series of operating processes of the snow removal apparatus 60 executed by the operating system 1 in the state shown in FIG. 1 will be described according to a flowchart shown in FIG. 4. In step S1 of FIG. 4, the parking request recognition part 15 determines whether the entry vehicle detection part 13 detects the first vehicle 70 entering the parking lot 120. Then, processing proceeds to step S2 when the first vehicle 70 entering the parking lot 120 is detected and proceeds to step S10 when the first vehicle 70 entering the parking lot 120 is not detected.

In step S10, the parking section management part 14 determines presence or absence of the second user U2 recognized to exit the store 110 from a captured image of the store camera 112. Then, the parking section management part 14 proceeds the processing to step S11 when the second user U2 is recognized. In step S11, the parking section management part 14 recognizes No. of a parking section (L2-9 in FIG. 1) in which the second user U2 has parked the second vehicle 80 with reference to the parking section DB 33 and writes a predicted exit time in the parking section DB. On the other hand, when the second user U2 exiting the store 110 is not recognized in step S10, the parking section management part 14 proceeds the processing to step S1.

In step S2, the specific parking section determination part 16 determines whether there is a vacant parking section 130 with reference to the parking section DB 33. If there is no vacant parking section 130, the specific parking section determination part 16 proceeds the processing to step S20 and transmits full state information for notifying that the parking lot 120 is full to the first vehicle controller 71 or the first user terminal 51 used by the first user U1. The first user U1 who has checked the full state information can perform operation such as waiting for the parking lot 120 to be vacant, going to other stores, or the like.

On the other hand, when there is a vacant parking section 130, the specific parking section determination part 16 proceeds from step S2 to step S3 and determines presence or absence of a vacant parking section 130 having no snow accumulation with reference to the parking section DB 33. Then, the specific parking section determination part 16 proceeds the processing to step S7 when there is a vacant parking section 130 having no snow accumulation. In this case, the parking guide part 19 transmits first guide information for guiding the vacant parking section 130 having no snow accumulation to the first vehicle controller 71 and the first user terminal 51.

In addition, when there is no vacant parking section having no snow accumulation, the specific parking section determination part 16 proceeds the processing from step S3 to step S4 and determines a specific parking section according to the aforementioned determination conditions 1 and 2. In the example of FIG. 1 to FIG. 3, the specific parking section determination part 16 determines the parking section 130a of No. L3-3 in which an elapsed time from an exit time is shortest from among vacant parking sections having snow accumulation as a specific parking section.

Subsequently, the snow removal instruction part 17 transmits the first snow removal instruction information for instructing the snow removal apparatus 60 to remove snow in the specific parking section 130a to the snow removal apparatus 60 in step S5. Accordingly, snow in the specific parking section 130a is removed by the snow removal apparatus 60 which has received the first snow removal instruction information. Subsequently in step S6, the snow removal completion recognition part 18 proceeds the processing to step S7 when it receives snow removal completion information notifying of completion of snow removal in the specific parking section 130a from the snow removal apparatus 60.

In step S7, the parking guide part 19 transmits first guide information representing the position of the specific parking section 130a in which snow removal is completed, a route to the specific parking section 130a, and the like to the first vehicle controller 71 and the first user terminal 51. The first user U1 who has checked the first guide information drives the first vehicle 70 to the specific parking section 130a and parks the first vehicle 70 thereat. Alternatively, the first vehicle controller 71 which has recognized the position of the specific parking section 130a through the first guide information causes the first vehicle 70 to autonomously travel to the specific parking section and causes the first vehicle 70 to be parked in the specific parking section 130a.

4. Other Embodiments

Although the parking section 130 having a parking space corresponding to a single vehicle is represented as a parking section of the disclosure in the above-described embodiment, a space in which a plurality of vehicles can be parked may be used as a parking section. For example, an area including a plurality of neighboring parking sections 130 may be handled as a parking section and snow removal may be performed for each area in the example of FIG. 1.

Although the specific parking section determination part 16 determines a specific parking section according to the aforementioned determination conditions 1 and 2 in the above-described embodiment, a specific parking section may be determined according to other determination conditions. For example, a parking section in which an elapsed time from a previous snow removal execution time is short may be preferentially selected from vacant parking sections having snow accumulation and determined as a specific parking section. Alternatively, a parking section closest to the store 110 from among vacant parking sections having snow accumulation may be determined as a specific parking section.

Although the snow removal instruction part 17 performs processing of removing snow accumulation which is an obstacle to exit of a vehicle from a parking section for vehicles exiting from parking sections in the above-described embodiment, a configuration in which this processing is not performed may be employed.

In the above-described embodiment, the snow removal completion information is transmitted to the first vehicle controller 71 of the first vehicle 70 and the first user terminal 51 used by the first user U1 when snow removal in a specific parking section is completed. As another configuration, a snow removal completion signal may be transmitted only to any one of the first vehicle 70 and the first user terminal 51.

Although the autonomous driving type snow removal apparatus 60 is represented in the above-describe embodiment, a snow removal apparatus driven by a driver may be used. In this case, a first snow removal instruction information and a second snow removal instruction information are transmitted to a driver terminal used by the driver. The driver terminal may be a portable terminal carried by the driver or a terminal mounted in the snow removal apparatus.

Although the snow removal apparatus operating system 1 is disposed in a place separated from the store 110 in the above-described embodiment, the snow removal apparatus operating system 1 may be configured using a management system 115 included in the store 110.

Meanwhile, FIG. 2 is a schematic diagram dividing and separately showing the functional configuration of the snow removal apparatus operating system 1 according to principal processing details in order to facilitate understanding of the disclosure, but the configuration of the snow removal apparatus operating system 1 may be divided in other manners. Furthermore, processing of each component may be executed by a single hardware unit or a plurality of hardware units. In addition, processing of each component shown in FIG. 2 may be executed by a single program or a plurality of programs.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A snow removal apparatus operating system, comprising:
    a memory, storing a user database, a parking section database, and a control program; and
    a processor, by reading and executing the control program stored in the memory, serving as:
    a snow state recognition part which recognizes a snow accumulation state of a parking lot in which a plurality of parking sections is provided from captured images of a parking lot camera installed in the parking lot and weather information of an area where the parking lot is located which is provided from a weather information server;
    a parking section management part which recognizes a usage state of each of the parking sections and manages entry and exit of a vehicle for each of the parking sections;
    a parking request recognition part which recognizes a request for parking in the parking lot;
    a specific parking section determination part which, determines whether there is a vacant parking section having no snow accumulation with reference to the parking section database, and determines a specific parking section as a snow removal target for securing a vacant parking space according to the request for parking from among the parking sections recognized to have snow accumulation by the snow state recognition part and recognized to have a vacant parking space by the parking section management part if there is no parking section recognized to have no snow accumulation by the snow state recognition part and recognized to have a vacant parking space by the parking section management part when the request for parking is recognized by the parking request recognition part; and
    a snow removal instruction part which transmits, to a snow removal apparatus controller of a snow removal apparatus disposed in order to perform snow removal in the parking lot, a first snow removal instruction information for instructing snow removal in the specific parking section, and the snow removal apparatus controller which has received the first snow removal instruction information causing the snow removal apparatus to autonomously travel to execute snow removal in the specific parking section, so as to perform snow removal using the snow removal apparatus in the specific parking section determined as the snow removal target.

2. The snow removal apparatus operating system according to claim 1, wherein the processor further serving as an entry vehicle detection part which detects a vehicle entering the parking lot from captured images of an entrance camera installed at an entrance of the parking lot,
    wherein the parking request recognition part recognizes a request for parking in the parking lot on the basis of a detection result obtained by the entry vehicle detection part.

3. The snow removal apparatus operating system according to claim 1, wherein the snow state recognition part recognizes a snowfall state of the parking lot from captured images of the parking lot camera and the weather information, and
    the specific parking section determination part determines the parking section in which an elapsed time from a previous vehicle exit time recognized by the parking section management part is within a predetermined time at the specific parking section when the snow state recognition part recognizes snowfall in the parking lot.

4. The snow removal apparatus operating system according to claim 1, wherein the snow state recognition part recognizes a snowfall state of the parking lot from captured images of the parking lot camera and the weather information, and
    the specific parking section determination part determines the parking section in which an elapsed time from a previous vehicle exit time recognized by the parking section management part is shortest at the specific parking section when the snow state recognition part recognizes snowfall in the parking lot.

5. The snow removal apparatus operating system according to claim 1, wherein the parking section management part recognizes a predicted exit time of a vehicle parked in the parking section which is recorded in the parking section database, and
    when the snow state recognition part recognizes snow accumulation with respect to a predicted exit parking section which is the parking section for which the predicted exit time is recognized, the snow removal instruction part transmits, to the snow removal apparatus, a second snow removal instruction information for instructing snow removal in the predicted exit parking section to be started from a snow removal time corresponding to vehicle exit which is set before the predicted exit time.

6. A snow removal apparatus operating method executed by a computer comprising a memory storing a user database, a parking section database, and a control program and a processor in order to operate a snow removal apparatus by reading and executing the control program stored in the memory, the snow removal apparatus operating method comprising:
    a snow state recognition step of recognizing, by the computer, a snow accumulation state of a parking lot in which a plurality of parking sections is provided from captured images of a parking lot camera installed in the parking lot and weather information of an area where the parking lot is located which is provided from a weather information server;

a parking section management step of recognizing, by the computer, a usage state of each of the parking sections and managing, by the computer, entry and exit of a vehicle for each of the parking sections;

a parking request recognition step of recognizing, by the computer, a request for parking in the parking lot;

a specific parking section determination step of determining, by the computer, whether there is a vacant parking section having no snow accumulation with reference to the parking section database, and determining, by the computer, a specific parking section as a snow removal target for securing a vacant parking space according to the request for parking from among the parking sections recognized to have snow accumulation in the snow state recognition step and recognized to have a vacant parking space in the parking section management step if there is no parking section recognized to have no snow accumulation in the snow state recognition step and recognized to have a vacant parking space in the parking section management step when the request for parking is recognized in the parking request recognition step; and a snow removal instruction step of transmitting, to a snow removal apparatus controller of a snow removal apparatus disposed in order to perform snow removal in the parking lot, a first snow removal instruction information for instructing snow removal in the specific parking section, and the snow removal apparatus controller which has received the first snow removal instruction information causing the snow removal apparatus to autonomously travel to execute snow removal in the specific parking section, so as to perform snow removal using the snow removal apparatus in the specific parking section determined as the snow removal target.

* * * * *